United States Patent
Conti et al.

(10) Patent No.: US 12,026,462 B2
(45) Date of Patent: Jul. 2, 2024

(54) WORD EMBEDDING MODEL PARAMETER ADVISOR

(71) Applicant: International Business Machines Corporation, Armonk, NY (US)

(72) Inventors: Thomas Conti, Poughkeepsie, NY (US); Rajesh Bordawekar, Westchester, NY (US); Stephen Warren, Hopewell Junction, NY (US); Christopher Harding, Port Jervis, NY (US); Jose Neves, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 16/204,486

(22) Filed: Nov. 29, 2018

(65) Prior Publication Data

US 2020/0175390 A1 Jun. 4, 2020

(51) Int. Cl.
*G06F 40/216* (2020.01)
*G06F 11/36* (2006.01)
(Continued)

(52) U.S. Cl.
CPC ........ *G06F 40/216* (2020.01); *G06F 11/3672* (2013.01); *G06F 18/23213* (2023.01);
(Continued)

(58) Field of Classification Search
CPC .......... G06N 5/04; G06N 20/10; G06N 3/088; G06N 3/0985; G06F 40/20; G06F 11/3672; G06K 9/6223; G06K 9/6267
See application file for complete search history.

(56) References Cited

U.S. PATENT DOCUMENTS 9,430,563 B2  8/2016  Clinchant et al.
9,922,025 B2  3/2018  Cross, III et al.
(Continued)

OTHER PUBLICATIONS

Feurer et al., "Initializing Bayesian Hyperparameter Optimization via Meta-Learning," Association for the Advancement of Artificial Intelligence (2015), retrieved from <https://aad.informatik.uni-freiburg.de/wp-content/uploads/papers/15-AAAI-MI-SMBO.pdf> (Year: 2015) (Year: 2015).*

(Continued)

*Primary Examiner* — Miranda M Huang
*Assistant Examiner* — Yao David Huang
(74) *Attorney, Agent, or Firm* — CANTOR COLBURN LLP; Teddi Maranzano

(57) ABSTRACT

Methods, systems and computer program products for determining recommended parameters for use in generating a word embedding model are provided. Aspects include storing a plurality of meaningful test cases. Each meaningful test case includes a test data profile and one or more test model parameters used to create a word embedding model that has been classified as yielding meaningful results. Aspects include receiving a production data set to be used in generating a new word embedding model. The production data set includes data stored in a relational database having a plurality of columns and a plurality of rows. Aspects include generating a data profile associated with the production data set. Aspects include generating a recommendation for one or more production model parameters for use in building a word embedding model based on the data profile associated with the production data set and the plurality of meaningful test cases.

25 Claims, 9 Drawing Sheets

(51) Int. Cl.
*G06F 18/23213* (2023.01)
*G06F 18/24* (2023.01)
*G06F 40/20* (2020.01)
*G06N 3/088* (2023.01)
*G06N 5/04* (2023.01)
*G06N 20/10* (2019.01)

(52) U.S. Cl.
CPC .............. *G06F 18/24* (2023.01); *G06F 40/20* (2020.01); *G06N 3/088* (2013.01); *G06N 5/04* (2013.01); *G06N 20/10* (2019.01)

(56) References Cited

U.S. PATENT DOCUMENTS

| | | | |
|---|---|---|---|
| 9,947,314 | B2 | 4/2018 | Cao et al. |
| 10,019,438 | B2 | 7/2018 | Audhkhasi et al. |
| 10,719,301 | B1* | 7/2020 | Dasgupta ............. G06K 9/6267 |
| 11,030,539 | B1* | 6/2021 | Arfa ....................... G06F 40/295 |
| 11,182,806 | B1* | 11/2021 | Arfa ................... G06Q 30/0201 |
| 2015/0220833 | A1 | 8/2015 | Le |
| 2016/0162467 | A1 | 6/2016 | Munro et al. |
| 2016/0350288 | A1 | 12/2016 | Wick et al. |
| 2016/0358094 | A1 | 12/2016 | Fan et al. |
| 2017/0011289 | A1 | 1/2017 | Gao et al. |
| 2017/0139984 | A1 | 5/2017 | Bordawekar et al. |
| 2017/0270100 | A1 | 9/2017 | Audhkhasi et al. |
| 2018/0068371 | A1 | 3/2018 | Krishnamurthy et al. |
| 2018/0090128 | A1 | 3/2018 | Kurata et al. |
| 2018/0113938 | A1 | 4/2018 | Piramuthu et al. |
| 2018/0157644 | A1 | 6/2018 | Mandt et al. |
| 2018/0189265 | A1 | 7/2018 | Chen et al. |
| 2018/0196800 | A1 | 7/2018 | Volkovs et al. |
| 2018/0211260 | A1* | 7/2018 | Zhang ..................... G06N 20/00 |
| 2018/0240041 | A1* | 8/2018 | Koch ................ G06F 16/24578 |
| 2018/0267976 | A1 | 9/2018 | Bordawekar et al. |
| 2018/0267977 | A1 | 9/2018 | Bandyopadhyay et al. |
| 2018/0268025 | A1 | 9/2018 | Bandyopadhyay et al. |
| 2018/0268584 | A1* | 9/2018 | Bobovich ............. G06K 9/6256 |
| 2018/0336641 | A1* | 11/2018 | Dziabiak ................ G06Q 30/02 |
| 2018/0357799 | A1* | 12/2018 | Sexton .................. G06T 11/206 |
| 2019/0147371 | A1* | 5/2019 | Deo ........................ G06N 20/20 706/12 |
| 2019/0180175 | A1* | 6/2019 | Meteer .................... G06N 20/00 |
| 2019/0286704 | A1 | 9/2019 | Volkovs |
| 2019/0286734 | A1* | 9/2019 | Kao ........................ G06N 20/00 |
| 2020/0012584 | A1* | 1/2020 | Walters ................ G06K 9/6277 |
| 2020/0057936 | A1 | 2/2020 | Haeusser |
| 2020/0104367 | A1 | 4/2020 | Tagra |
| 2020/0151647 | A1* | 5/2020 | Kathalagiri Somashekariah ........ G06N 20/00 |
| 2020/0159832 | A1 | 5/2020 | Cai |
| 2020/0162484 | A1* | 5/2020 | Solis Agea ......... H04L 63/1416 |

OTHER PUBLICATIONS

Venkataraman et al., "Techniques for effective vocabulary selection," arXiv:cs/0306022v1 [cs.CL] Jun. 4, 2003. (Year: 2003).*

Dridi et al., "k-NN Embedding Stability for word2vec Hyper-Parametrisation in Scientific Text," L. Soldatova et al. (Eds.): DS 2018, LNAI 11198, pp. 328-343, 2018 (available online Oct. 7, 2018) (Year: 2018).*

Somol et al., "Feature selection toolbox," Pattern Recognition 35 (2002) 2749-2759 (Year: 2002).*

Gigli et al., "Fast Feature Selection for Learning to Rank," ICTIR '16, Sep. 12-16, 2016, Newark, DE, USA (Year: 2016).*

List of IBM Patents or Patent Applications Treated as Related; (Appendix P), Filed Nov. 30, 2018; 2 pages.

Rajesh Bordawekar et al., "Cognitive Database: A Step towards Endowing Relational Databases with Artificial Intelligence Capabilities", The Computing Research Repository (CoRR), Dec. 2017, 14 pgs.

Rajesh Bordawekar et al., "Enabling Cognitive Intelligence Queries in Relational Databases using Low-dimensional Word Embeddings", The Computing Research Repository (CoRR), Mar. 2016, 12 pgs.

Thomas Conti, et al., "Dynamic Updating of a Word Embedding Model", U.S. Appl. No. 16/204,408, filed Nov. 29, 2018.

Ethan Fast et al., "Lexicons on Demand: Neural Word Embeddings for Large-Scale Text Analysis", Proceedings of the Twenty-Sixth International Joint Conference on Artificial Intelligence (IJCAI-17), Melbourne, Australia Aug. 19-25, 2017, 5 pgs.

Hamed Zamani et al., "Relevance-based Word Embedding", In Proceedings of the 40th International ACM SIGIR Conference on Research and Development in Information Retrieval (SIGIR '17). ACM, New York, NY, USA, 10 pgs.

Pranava Swaroop Madhyastha et al., "Mapping Unseen Words to Task-Trained Embedding Spaces", Proceedings of Workshop on Representation Learning for NLP, ACL 2016, Berlin, Germany, 11 pgs.

Ziqian Zeng et al., "Socialized Word Embeddings", Proceedings of the Twenty-Sixth International Joint Conference on Artificial Intelligence (IJCAI-17), Melbourne, Australia Aug. 19-25, 2017, 7 pgs.

* cited by examiner

WORD EMBEDDING MODEL PARAMETER ADVISOR

BACKGROUND

The present invention generally relates to generating word embedding models, and more specifically, to providing an advisor to identify parameters for use in generating a meaningful word embedding model.

Word embedding generally involves a set of language modeling and feature learning techniques in natural language processing (NLP) in which words and phrases from a vocabulary of words are mapped to vectors of real numbers ("word vectors") comprising a word embedding model. Word embedding models may typically be generated by training a neural network using machine learning based on a data from a relational database. This process requires a large number of computations and thus, generally requires a large amount of processing resources and time to generate a model. Once generated, the word embedding model may then be queried to reveal various relationships between data, such as for example, determining similarity between entities.

However, the meaningfulness of the model and of the query results can be positively or negatively impacted by the selection of various parameters used in generating the model. Meaningfulness can describe how well the model represents the desired behavior (e.g., whether two entities identified as similar by the model share common features with one another more so than with other entities). Meaningfulness can also refer to the accuracy of a query result when performing a query against the model. Thus, selecting the right parameters is important to the successful design of a meaningful word embedding model, but this is a difficult problem because the nature of variability among data sets means that different parameter values may work better or worse in conjunction with different data sets, and thus there is no universal set of parameter values that works well with all data sets to generate meaningful models. Conventionally, such parameters are determined by a data scientist through a process of experimentation based on trial and error to discover parameters that appear to result in the generation of a meaningful model based on a given data set. However, because generating a word embedding model requires a large amount of processing resources and time, such experimentation is costly in terms of both the time it takes as well as the computing resources required to arrive to achieve desired design specifications. Further, even if a designer arrives at a seemingly acceptable set of design parameter values, there may exist one or more sets of other design parameter values that may yield more meaningful results.

SUMMARY

Embodiments of the present invention include methods, systems, and computer program products for determining recommended parameters for use in generating a word embedding model. A non-limiting example of a computer-implemented method includes storing a plurality of meaningful test cases. Each meaningful test case includes a test data profile and one or more test model parameters used to create a word embedding model that has been classified as yielding meaningful results. The method includes receiving a production data set to be used in generating a new word embedding model. The production data set includes data stored in a relational database having a plurality of columns and a plurality of rows. The method includes generating a data profile associated with the production data set. The method further includes generating, based on the data profile associated with the production data set and the plurality of meaningful test cases, a recommendation for one or more production model parameters for use in building a word embedding model based on the production data set. Advantages can include improvement of word embedding model representation quality and reduction in the amount processing power expended to identify parameters for use in generation of a meaningful word embedding model.

In addition to one or more of the features described above or below, or as an alternative, further embodiments may include that for each meaningful test case of the plurality of meaningful test cases, storing the meaningful test case includes receiving an indication that a word embedding model generated based on a test data set associated with the meaningful test case yields meaningful results, profiling the test data set associated with the meaningful test case to create a test data profile associated with the meaningful test case and mapping the test data profile associated with the meaningful test case to parameters used to produce the word embedding model that yields meaningful results. Advantages can also include improvement of model representation quality.

In addition to one or more of the features described above or below, or as an alternative, further embodiments may include that an indication that the word embedding model yields meaningful results represents a determination that a degree to which results of one or more queries of the word embedding model correspond to expected results of the query exceeds a predetermined threshold. Advantages can also include allowing for the specification of a minimum level of meaningfulness of the meaningful test cases to ensure adequate usefulness of parameter recommendations.

In addition to one or more of the features described above or below, or as an alternative, further embodiments may include outputting the recommendation for one or more production model parameters for use in building a word embedding model based on the production data set for display. Advantages can also include decreasing the amount of time needed to build a meaningful model.

In addition to one or more of the features described above or below, or as an alternative, further embodiments may include automatically initiating the training of a word embedding model based on the production data set and the recommendation for one or more production parameters for use in building the word embedding model.

Advantages can also include automated development and generation of meaningful models.

In addition to one or more of the features described above or below, or as an alternative, further embodiments may include that generating a data profile associated with the production data set includes characterizing the production data set based on one or more of a number of rows included in the plurality of rows of the relational database, a number of columns included in the plurality of columns of the relational database, a size of a vocabulary of the relational database, wherein the vocabulary comprises a number of unique words or values, for each column of the plurality of columns, a size of vocabulary of the column, for each column of the plurality of columns, a characterization of types of data included in the column, wherein types of data comprise at least word, string and numeric types, a distribution of unique words by column, numeric data clustering methods associated with the production data set and cluster edge boundary detection associated with the production data set. Advantages can also include reduction in model development time through automatic data profiling.

In addition to one or more of the features described above or below, or as an alternative, further embodiments may include that model parameters include one or more of a weighting for each column of the plurality of columns, each weighting to be applied to a respective column of the plurality of columns during generation of the new word embedding model, a selection of one or more columns of the plurality of columns to include in the training of the word embedding model, a number of iterations used to in generating a word embedding model using a neural network, selection of one or more algorithms configured to determine relationships between words for use in generating a word embedding model, debugging parameters, multi-threading parameters and input and output file names. Advantages can also include reduction in model development time through determining suggested parameter values for meaningful models across many different parameters.

In addition to one or more of the features described above or below, or as an alternative, further embodiments may include that generating a recommendation for one or more production model parameters for use in building a word embedding model based on the production data set includes recommending a weighting for each column of the plurality of columns, the recommendation being determined by assigning a higher relative weightings to columns comprising a large vocabulary size relative to other columns and assigning lower relative weightings to columns having a small vocabulary size relative to other columns and/or columns having a high number of null values relative to other columns. Advantages can also include improved accuracy of results by appropriate weightings for more discriminating features of the data.

In addition to one or more of the features described above or below, or as an alternative, further embodiments may include that generating a recommendation for one or more production model parameters for use in building a word embedding model based on the test data set includes identifying a most similar test data profile of the meaningful test cases based on a comparison of the data profile associated with the production data set to test data profiles associated with the plurality of meaningful test cases and selecting one or more model parameters based on the one or more test model parameters associated with the meaningful test case comprising the most similar test data profile. Advantages can also include reduction in model development time through automatic identification of parameters that are likely to yield meaningful results.

In addition to one or more of the features described above or below, or as an alternative, further embodiments may include that generating a recommendation for one or more production model parameters for use in building a word embedding model based on the test data set includes identifying a plurality of similar test data profiles of the meaningful test cases based on a comparison of the data profile associated with the production data set to test data profiles associated with the plurality of meaningful test cases, wherein each similar test data profile exceeds a threshold level of similarity with the data profile associated with the production data and selecting one or more model parameters based on the one or more test model parameters associated with each of the meaningful test cases corresponding to the plurality of similar test data profiles. Advantages can also include allowing specification of a minimal level of likely meaningfulness of results based on automatic parameter recommendations.

In addition to one or more of the features described above or below, or as an alternative, further embodiments may include that generating a recommendation for one or more production model parameters for use in building a word embedding model based on the production data set includes generating a recommendation for preprocessing of the production data to include one or more of a numeric data clustering method and cluster edge boundary detection method to achieve data clustering. Advantages can also include determination of more comparable data profiles to yield a more meaningful model.

Embodiments of the present invention include methods, systems, and computer program products for updating a word embedding model parameter advisor. A non-limiting example of a computer-implemented method includes receiving a data set for use in generation of a word embedding model. The data set includes data stored in a relational database having a plurality of columns and a plurality of rows. The method includes generating a data profile associated with the data set. The method includes generating a recommendation for one or more model parameters for use in building a word embedding model based on the data profile and a set of meaningful test cases. The method includes generating, by training a neural network using unsupervised machine learning based on the first data set, a word embedding model based on the recommended one or more model parameters and the data set. Based on one or more queries of the word embedding model, the method includes receiving an indication of a determination of a degree of meaningfulness of query results. In response to the degree of meaningfulness of query results exceeding a predetermined threshold, the method includes updating the set of meaningful test cases to include a new test case comprising the data profile and model parameters used to create the word embedding model. Advantages can include automatic iterative improvement of parameter advisor for improved parameter recommendation for more meaningful model generation.

In addition to one or more of the features described above or below, or as an alternative, further embodiments may include generating a data profile associated with the production data set includes characterizing the data set based on one or more of a number of rows included in the plurality of rows of the relational database, a number of columns included in the plurality of columns of the relational database, a size of a vocabulary of the relational database, wherein the vocabulary comprises a number of unique words or values, for each column of the plurality of columns, a size of vocabulary of the column, for each column of the plurality of columns, a characterization of types of data included in the column, wherein types of data comprise at least word, string and numeric types, a distribution of unique words by column, numeric data clustering methods associated with the production data set and cluster edge boundary detection associated with the production data set. Advantages can also include reduction in model development time through automatic data profiling.

In addition to one or more of the features described above or below, or as an alternative, further embodiments may include that the set of meaningful test cases includes a plurality of known meaningful test cases, where each known meaningful test case is associated with respective test data and respective selected parameters and each known meaningful test case is classified as yielding meaningful results in response to creating a word embedding model by training a neural network using unsupervised machine learning based on the respective test data and the respective selected parameters. Advantages can also include improvement of model representation quality.

In addition to one or more of the features described above or below, or as an alternative, further embodiments may include that receiving an indication of a determination of a degree of meaningfulness of query results includes receiving a user input representing the degree of meaningfulness of query results. Advantages can also include increasing the usefulness of parameter advisor recommendations by filtering parameter advisor test cases based on model meaningfulness.

A system for determining recommended parameters for use in generating a word embedding model includes a memory having computer readable computer instructions, and a processor for executing the computer readable instructions that execute the steps of the computer-implemented method described above. A computer program product for determining recommended parameters for use in generating a word embedding model includes a computer readable storage medium having program instructions embodied therewith to execute the steps of the computer-implemented method described above. A system for u revising a word embedding model parameter advisor includes a memory having computer readable computer instructions, and a processor for executing the computer readable instructions that execute the steps of the computer-implemented method described above. A computer program product for revising a word embedding model parameter advisor includes a computer readable storage medium having program instructions embodied therewith to execute the steps of the computer-implemented method described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
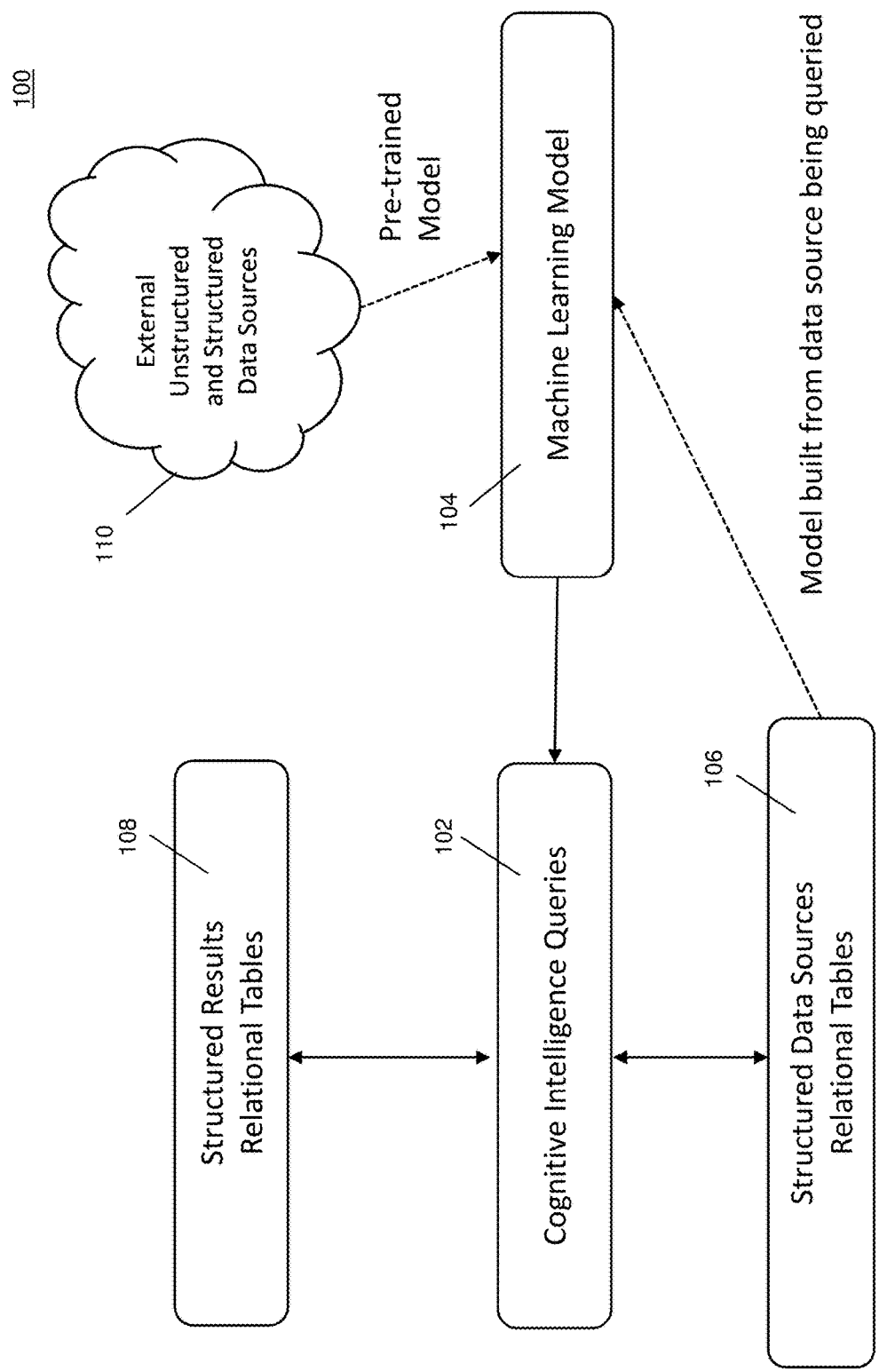
FIG. 1 is a block diagram illustrating one example of an operating environment in accordance with an example embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As described above, building a word embedding model from relational database data can be difficult and time consuming given the fact that there is no one set of modeling parameters that work for all variations of the data as modeling parameters can be very specific to the profile of the data. Conventionally, a data scientist will typically experiment with various modeling parameters with the goal of achieving an end result that produces a model that is the most useful and produces the most useful results by using a trial and error approach. Modeling with big data is beneficial because such models enable hidden cognitive insights into the data, where the data scientist may not be aware of what meaningful results will be. With large data sets (i.e., many features) that are constantly changing, it is generally very difficult, if not impossible, for an individual to identify the correct relationships between all of the entities, and thus such models can be of great benefit. However, identifying parameters that will result in meaningful models and/or results is very difficult when modeling with big data. Attempting to identify suitable parameters by trial and error involves significant time, work and processing power, and may nonetheless not result in the best possible set of parameters to use with a given data set if the data scientist does not correctly guess the optimal parameter set. Embodiments of the present disclosure allow for savings in model development time and processing resources required to identify parameters for use in generating a meaningful word embedding model by providing statistics-based hyper parameter identification and recommendation for building a word embedding model by, for example, correlating cognitive query result set(s) to the known best case traditional results. Further, parameters identified by a word embedding model parameter advisor as disclosed herein may generally result in the generation of more meaningful word embedding models than a trial and error method, by utilizing comparisons of a data profile of a present data set to a plurality of generated test variations having known data, known data profiles, and known meaningful results by interpolating the large known set of data profiles (e.g., determining a closest profile relationship between the present data set and one of the known data profiles), meaningful results and modeling parameters. Accordingly, embodiments of the disclosure may allow both experienced and novice data scientists to achieve useful relational data word embedding models that would produce meaningful results with less work and in shorter time.

Accordingly, some embodiments of the present disclosure provide for a word embedding model parameter advisor to, for example, determine recommended parameters for use in generating a word embedding model based on a relational database that will yield meaningful results when queried. As disclosed herein, computer-implemented methods enable relational databases to capture and exploit semantic contextual similarities using standard SQL queries and a class of SQL-based queries known as Cognitive Intelligence (CI) queries. For the results of such CI queries to be useful and meaningful, it is necessary to build the word embedding model using parameters that will yield meaningful results. However, conventionally, this requires designers to essentially perform "guess and check" experimentation with different parameters during model generation to discover parameters that yield meaningful results. But this is incredibly inefficient as each instance of training a word embedding model requires a large amount of processing resources and takes a very long among of time (e.g., days), which can unduly delay the process of developing a word embedding model. Further, even if a developer finds parameters that appear to generate meaningful results, the developer has no way of knowing if a different set of parameters may be used to generate results that are even more meaningful, which likely means that the parameters selected by the developer are not the parameters that would yield the most meaningful word embedding model. To solve this problem, embodiments of the present invention provide for word embedding model parameter advisor that can profile the data set that will be used to generate the word embedding model, and based on a comparison to a plurality of known meaningful test cases, provide a recommendation for one or more parameters to use in building the word embedding model based on the data set. The system may also be configured to iteratively update the word embedding model parameter advisor based on the meaningfulness of the word embedding model generated based on the recommended parameters. Generally speaking, the meaningfulness of a word embedding model can be determined by comparing the results of queries (such as CI queries) of the word embedding model to expected results. For example, in some embodiments, meaningfulness may be determined by calculating the amount of common values between entities that have been identified by a model as being similar and associating a percentage with these values. Across various models, these values can be compared and ranked to determine which of the models yield the most meaningful results. Alternatively, query result sets (e.g., cognitive query results) of various models can be plotted on a line chart that includes values mapping the number of matching characteristics to a line of expected results and the degree of correlation between the two lines may represent a confidence of the accuracy of the model.

For a given relational database, such as a database containing information about employees of a specific company, typical SQL queries only return a result if there is a match for the query. For example, if a query wants information for employee A, such as salary, title, etc., an answer is returned only if there is an employee A. However, using CI queries, an answer may be returned by examining the relationship of each word embedded in the database by querying a word embedding model developed based on the database. For traditional SQL purposes, attributes such as name, age, gender, title, etc., are independent and this information is not exploited by the query.

Some embodiments of the present disclosure use word embedding, which is an unsupervised machine learning technique from natural language processing (NLP), to extract latent information. Disclosed techniques may also be applicable to other data models such as Multidimensional online analytical processing (MOLAP), JavaScript Object Notation (JSON), eXtensible Markup Language (XML), comma-separated value (CSV) files, spreadsheets, etc. According to some embodiments, the non-CSV data types can be transformed to a CSV format for use as in input to a word embedding model, such as word2vec.

In word embedding, a d-dimensional vector space is fixed. Each word in a text corpus (e.g., collection of documents) is associated with a dimension d vector of real numbers. The assignment of words to vectors should be such that the vectors encode the meaning of the words. Ideally, if two words are closely related (i.e. have similar meaning), their vectors should point in similar directions. In other words, the cosine distance between their vectors should be relatively high. By closely related words we mean words that appear together often in the text corpus. By appear together, we mean within close proximity. Conversely, if words are unrelated, the cosine distance between their vectors should be relatively small. Some refinements of the calculation of closeness weigh the proximity and/or consider grammar rules.

Over the last few decades, a number of methods have been introduced for computing vector representations of words in a natural language, such as word2vec or GloVe. Recently, word2vec has gained prominence as the vectors produced appear to capture syntactic as well semantic properties of words. These vector representations seem to capture closeness of words and syntactic (e.g., present-past, singular-plural) as well as semantic closeness of words. One application of word2vec produced vectors was in solving analogy problems, such as . . . a king is to a man like what is to a woman? (answer: queen) by using vector algebra calculations.

Vectors may be produced by either learning on the database itself or using external text, or vector sources. In the relational database context, one way of generating vectors is to apply the word embedding method to a token sequence generated from the database: each row would correspond to a sentence and a relation would correspond to a document. Thus, vectors enable a dual view of the data: relational and (meaningful) text. Word embedding then may extract latent semantic information in terms of word associations and co-occurrences and encode it in word vectors. Thus, the vectors capture first inter- and intra-attribute relationships within a row (sentence) and then aggregate these relationships across the document to compute the collective semantic relationships. The encoded semantic information then may be used in querying the database. Some embodiments of the present invention integrate word embedding techniques and capabilities into traditional database systems.

FIG. 1 is a block diagram illustrating one example of an operating environment 100 in accordance with the present invention. The operating environment 100 operates as a cognitive data management system to adapt relational databases 106 containing multiple data types for use with cognitive intelligence queries in accordance with one aspect of the present invention. As depicted, cognitive intelligence queries 102 in structured query systems use a machine learning model 104 to answer structured query language (SQL) queries pertaining to structured data source(s) 106, such as in relational tables. Responses to queries are returned as structured results 108, which also may be in the form of relational tables. The machine learning model 104 may be built from the source being queried, i.e. structured data source 106, from pre-trained from external data source 110, such as WIKIPEDIA™ or from the text corpuses of 106 and text from external sources.

Figure 2:
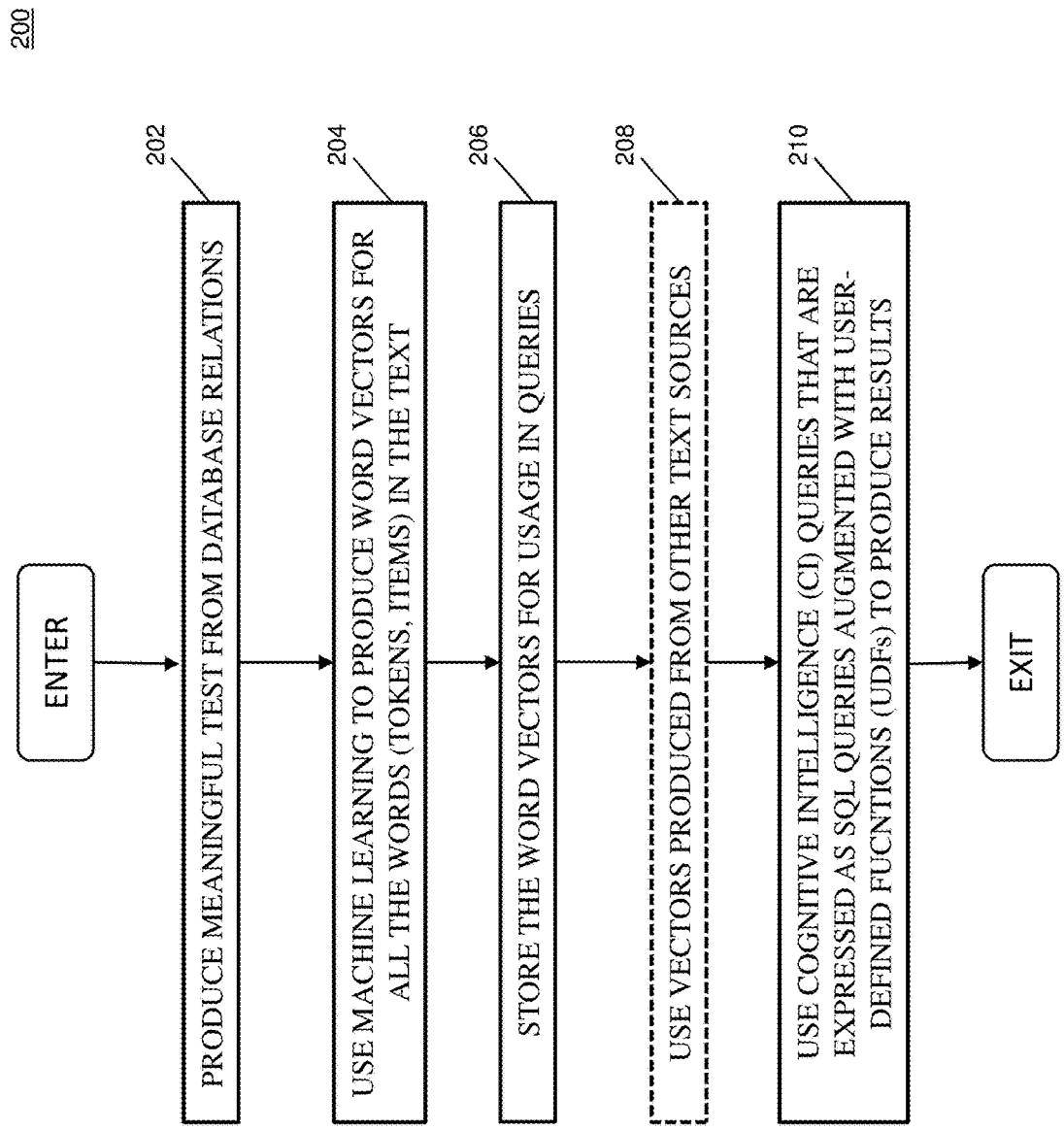
FIG. 2 depicts an exemplary process for producing word vectors from data from a relational database for use by cognitive intelligence (CI) queries according to an example embodiment.
Figure 3:
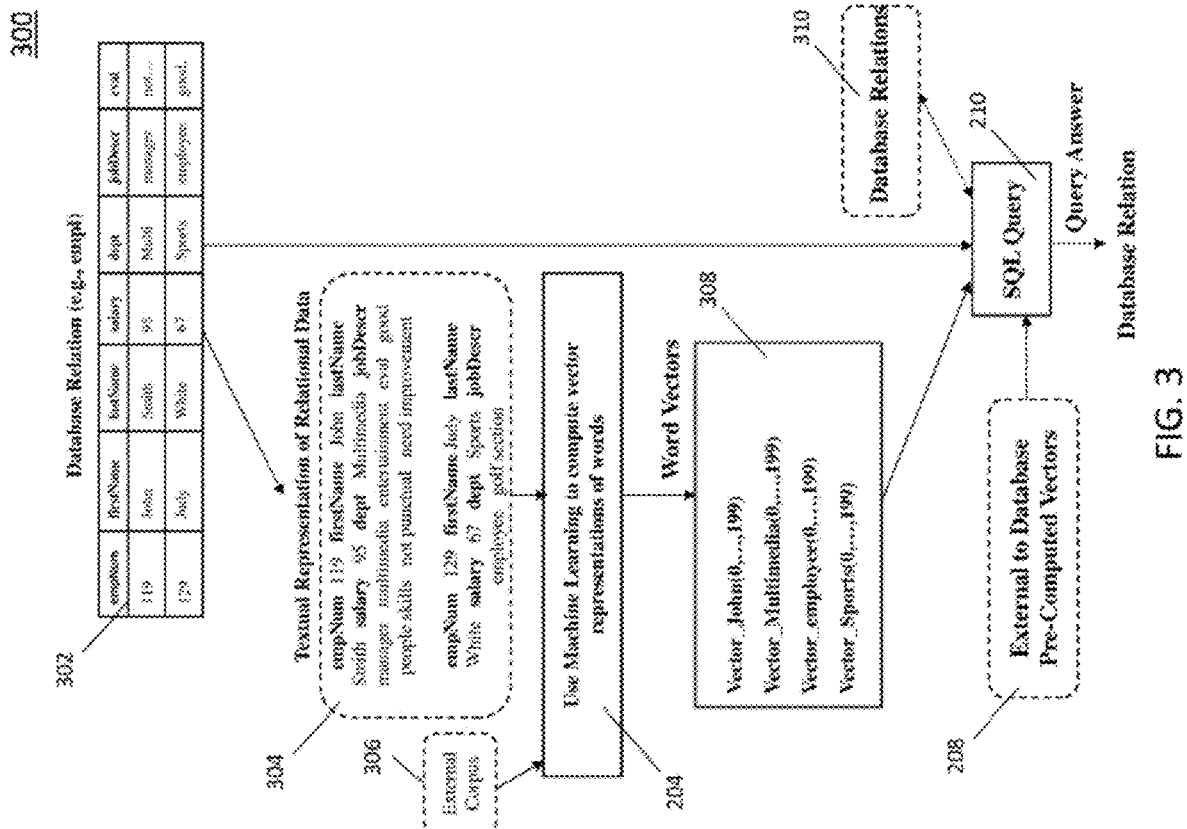
FIG. 3 depicts example states of the process of FIG. 2 in accordance with an example embodiment.

Exemplary steps for enhancing a system 100 with the cognitive capabilities enabled by word vectors will be described with reference to FIG. 2, which will be further described with reference to the example states of the process is shown in FIG. 3.

FIG. 2 depicts an exemplary process for producing word vectors from data from a relational database for use by cognitive intelligence (CI) queries. FIG. 3, which is described in more detail below, depicts example states of the process of FIG. 2.

By way of introduction and overview (only) to the following example, it is assumed that the fields of a relational database are populated with information, e.g., relating to employees of a company (see e.g., FIG. 3, 302) and the tokens, or contents, of each field are related by placement of the rows and columns of the database. A token may be a string, a set or sequence of strings, a numeric value, an image or set of images (e.g., video), a time series, or other SQL types such as date, latitude and longitude, etc. It is further assumed (for purposes of this example only), that non-header rows contain information applicable to a specific employee, while each column contains the same type of information for every employee (see e.g., FIG. 3, 302, employee number (empNum), first name (firstName), last name (lastName), etc.)

Referring now to FIG. 2, at step 202, meaningful data is produced/extracted from database relations. Relevant information in a relational database can be determined by a view of underlying relations generated using traditional Select, Project and Join operators. The database view can be used to generate meaningful text from database tokens.

Which rows or columns are textified (i.e., made into a sequence of tokens) may be controlled by defining a view using standard relational operations. The meaning of a word (i.e. token) can be inferred from by means of its neighbors. The neighborhood context contributes to the overall meaning of the word. A meaning of a database token can be determined from other tokens in the row, the columns of a row, in turn, can be determined by the schema of its view.

For example, meaningful data can be extracted and a model created by mapping, e.g., converting a relational row to a sentence (cf FIG. 3, 302, 304). Other views may be defined such that not all the token occurrences in the database are used in building the model. One goal of a meaningful text model is to capture relationships between tokens (words, items) across and within columns.

At step 204, machine learning is used to produce word vectors for all words (tokens, items) in the text. For example, an algorithm can compute word vector representations for all words (optionally excluding header words) in the meaningful text. In some embodiments, an external source (or corpus) can also be used for model training (see e.g., FIG. 3, 306). A resulting set of low-dimensional (e.g., dimension=200) semantic representations of words, or "word vectors," can each represent one word (token). Although in this example, a "word" is used as a synonym for "token," not every token may be a valid word in a natural language sense. A token may be a string, a set or sequence of strings, a numeric value, an image or set of images (e.g., video), a time series, or other SQL types such as date, latitude and longitude, etc. The word vectors capture latent inter/intra-attribute relationships from a relational table or database and provide a unified representation of multi-modal relational data. Two words can be considered semantically similar (i.e. have similar meaning) if their word vectors are close in the vector space, based on a distance metric (e.g., cosine distance).

At step 206, the word vectors are stored for usage in queries. In some embodiments, word vectors include a vector for each token in the meaningful text. At step 208, vectors produced from other text sources (see e.g., step 204 and FIG. 3, 306) may optionally be used, solely or in conjunction with database-textified text.

At step 210, cognitive intelligence (CI) queries are used to produce database relation results. In some embodiments, CI queries can be expressed using standard SQL. Some embodiments enable CI queries using the word vectors in the vector space as user-defined functions (UDFs). Upon completion of step 210, the process exits.

FIG. 3 depicts example states of the process of FIG. 2 in accordance with the present invention. As depicted, tokens in relational database 302 are converted to meaningful text sentences 304. For example, the first (non-header) row of relational database 302 can be converted to "empNum 119 firstName John lastName Smith salary 95 dept Multimedia jobDescr 'manager, multimedia, entertainment' eval 'good people skills, not punctual, need improvement'. The meaningful text sentences 304, along with any optional external corpus 306, are then converted to word vectors 308 using machine learning 104. The resulting word vectors 308, such as Vector_John(0, . . . , 199), Vector_Multimedia(0, . . . , 199), etc., may be referred to as the "word embedding model" and can be used by an augmented SQL query 210 targeted toward relational databases 310 and provide enhanced results not previously obtainable using traditional SQL queries. In some embodiments, the augmented SQL query 210 can reflect one or more collections of pre-computed vectors 208, e.g., from external databases.

Figure 4:
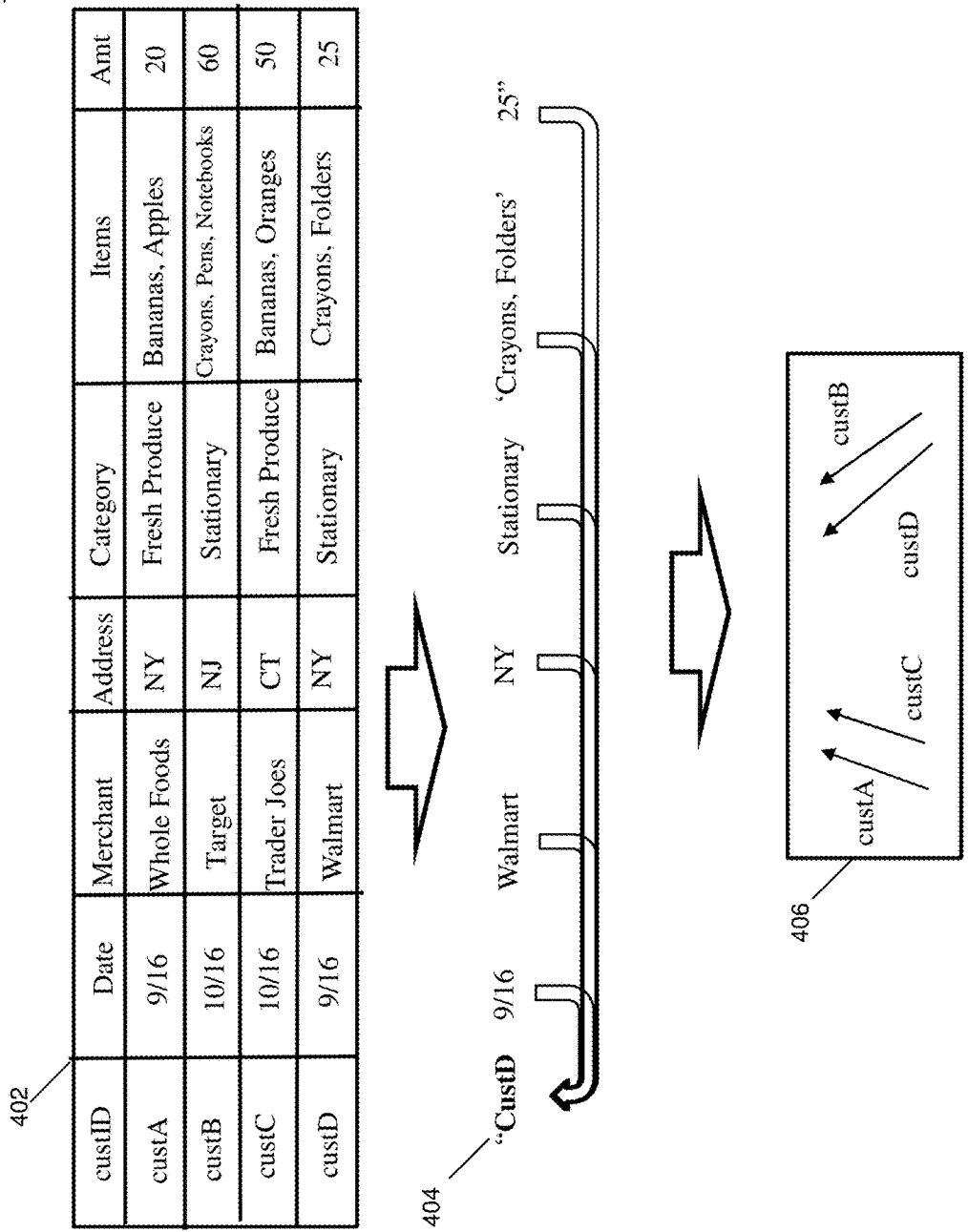
FIG. 4 depicts an example customer analytics query of a word embedding model based on a relational database in accordance with an example embodiment.
Figure 5:
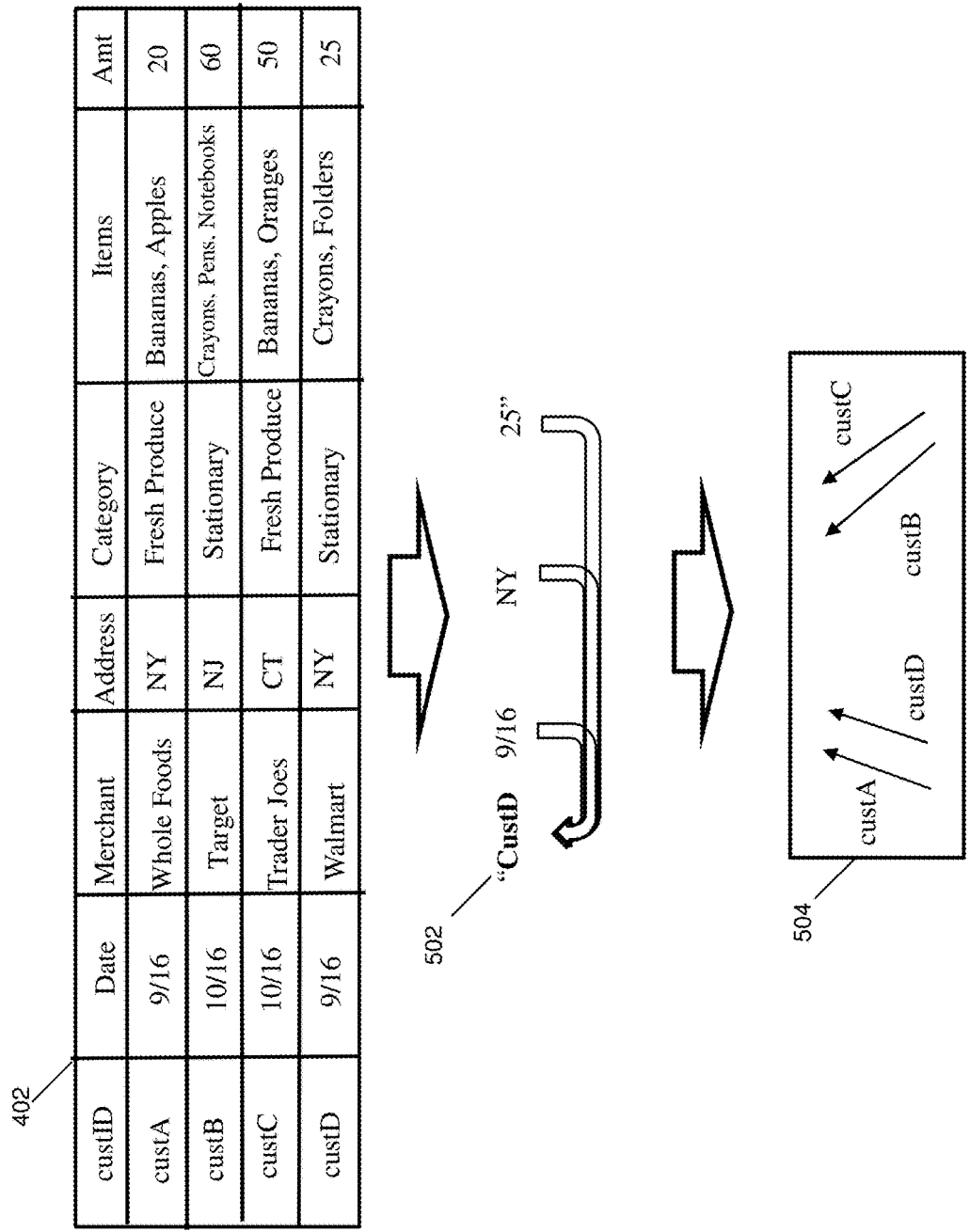
FIG. 5 depicts another example customer analytics query of a second word embedding model based on a relational database in accordance with an example embodiment.

FIG. 4 depicts an example customer analytics query using a first relational view (i.e., a first word embedding model) in accordance with the present invention. FIG. 5 depicts another example customer analytics query using a second relational view in accordance with the present invention.

Referring now to FIGS. 4 and 5, examples are provided wherein the relational database 402 provides information on customer purchases in retail stores. In FIG. 4, the view produces text containing all of the non-header token occurrences in the database 402. Thus, a vector is created for each token. A query to identify similar customers would examine the word vectors for each customer (i.e. custA, custB, custC, custD). So, for custD, the relevant row (tuple) 404 would be "custD 9/16 Walmart NY Stationery 'Crayons, Folders' 25". In the vector space, the word vector of custD is more similar to the word vector of custB as both bought stationery, including crayons. Likewise, the word vector of custA is more similar to the word vector of custC as both bought fresh produce, including bananas.

In FIG. 5, the view (i.e., the word embedding model generated based on the relational database) has changed such that the model only uses tokens for custlD, Date, Address and Amount." The row (tuple) 502 for custD has changed to "custD 9/16 NY 25". The word vectors are now produced on the text textified from this view. In this case, a query to identify similar customers would determine that custA is more similar to custD as both purchased goods in NY on 9/16 for similar amounts. Likewise, custB is now more similar to custC as both purchased goods on 10/16 for similar amounts.

Thus, as shown by FIGS. 4 and 5, word embedding models built from the same relational database can yield greatly different results for the same query based on the parameters used to build the model, such as which columns to include in the model training. The meaningfulness of the results (and by extension, the word embedding model), can be determined by comparing the results of such queries to expected results. For example, if the designers of the word embedding model consider CustD to be more similar to CustA in terms of the metrics the designers consider to be important, then the model generated in FIG. 5 may said to be more meaningful than the model generated in FIG. 4. As described in greater detail below, there are a number of parameters and/or hyperparameters that can affect the meaningfulness of a word embedding model.

Figure 6:
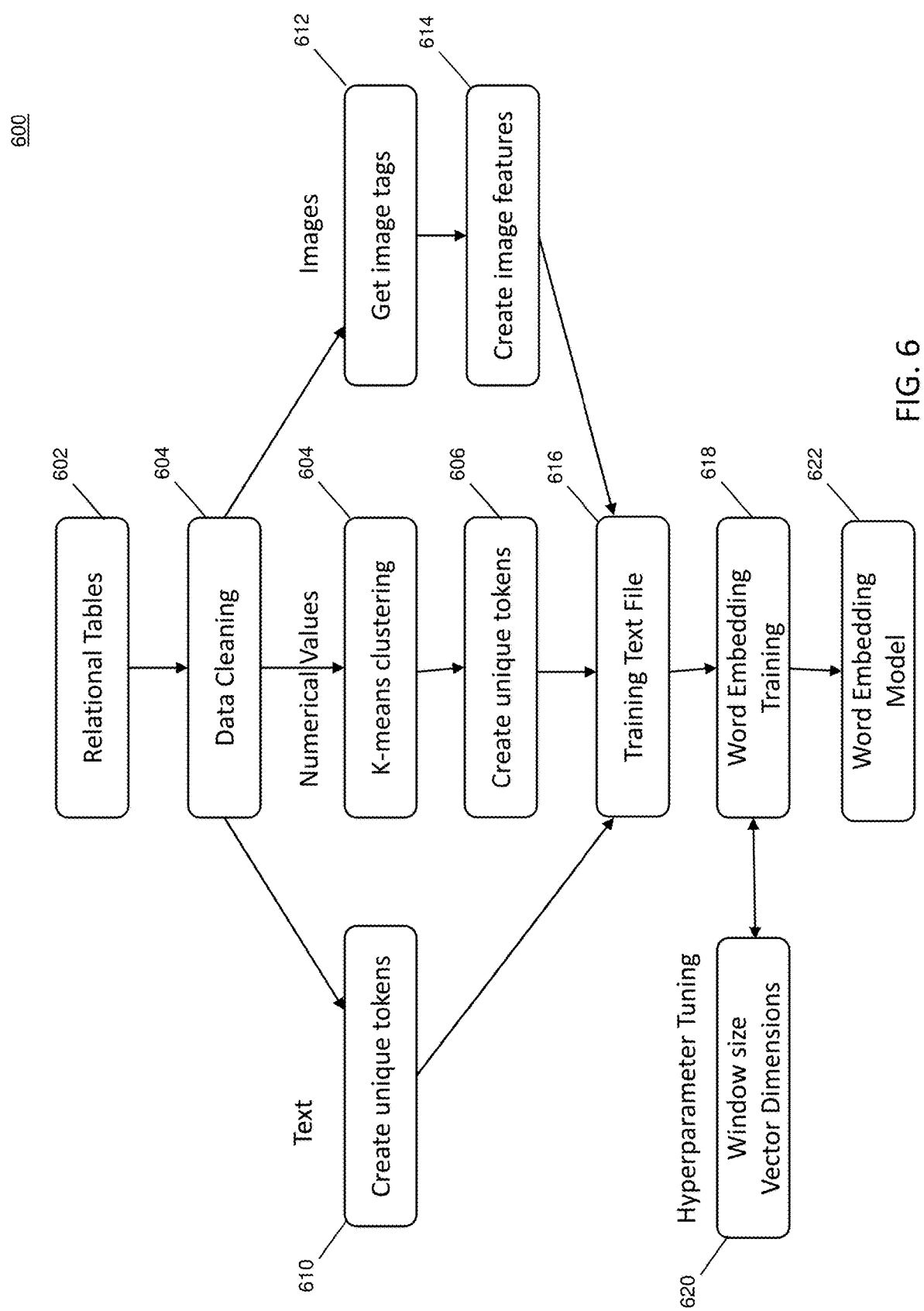
FIG. 6 depicts a method of generating a word embedding model in accordance with an example embodiment.

FIG. 6 depicts an example method 600 of generating a word embedding model that can be based on one or more of text, numerical values and images, and that can be used in conjunction with one or more embodiments of the present disclosure. At block 602, relational tables (such as table 302 in FIG. 3) having data can be received. At block 04, the data in the relational tables can be cleaned, by, for example, removing extraneous punctuation or spacing. With respect to numerical values, the data can undergo clustering, such as K-means clustering at block 606 and then unique tokens for each value can be created at block 608. With respect to text data, unique tokens representing each word can be created at block 610. With respect to image data, image tags can be created at block 612 and image features may be created at block 614. At block 616, a training text file may be compiled from the unique tokens and image features. At block 618, the training text file can be input into an artificial neural network in order to train a word embedding model. During training, at block 620, hyperparameter tuning with respect to, for example, window size and vector dimensions may be performed. Upon the completion of the training of the neural network, a word embedding model can be generated at block 622. FIG. 6 depicts various stages of the process of model development in which different parameters, custom data preprocessing steps, and/or hyperparameters may be specified and used. For example, at block 604, the system performs data cleaning on the relational database data, which can include processing each column and translating the value into a textual format. According to some embodiments, data cleaning may also include performing basic syntax fixes, such as for example, removing special characters. At block 606, the system may utilize k-means clustering to preprocess numerical values into different clusters. Specifiable parameters used in the k-means clustering can include, for example, the number of clusters, how many elements are associated with a cluster and/or the clustering routine or algorithm used to determine the distribution of the clustering. For example, one type of clustering routine may determine an optimal number of clusters that contains an even number of elements, although this type of clustering routine may require a large amount of processing resources to execute, and so it may be preferable to use a less costly clustering routine. At block 618, the training of the neural network using the data derived from the relational database(s) is performed. Prior to initiating the training, various hyperparameters such as window size, vector dimensions, a selection of one or more columns of the plurality of columns to include in the training of the word embedding model, a number of iterations used in generating the word embedding model using a neural network, a selection of one or more algorithms configured to determine relationships between words for use in generating a word embedding model, debugging parameters, multi-threading parameters, input/output file names, and other such hyperparameters may be specified for use in training the model at block 618. According to some embodiments of the present disclosure, a selection of a weighting of each column of a plurality of columns of the relational database(s) may be made to provide more weight to some categories than others when training the model at block 618.

Accordingly, there are a number of parameters that can influence the meaningfulness of a word embedding model, such as: a selection of one or more columns of the plurality of columns to include in the training of the word embedding model, a number of iterations used to in generating a word embedding model using a neural network (i.e., the number of iterations that the neural network processes the data in order to generate the weights and biases associated with the neural network to improve the model), a selection of one or more algorithms configured to determine relationships between words for use in generating a word embedding model, debugging parameters, multi-threading parameters and input and output file names. In addition to a selection of one or more columns of the plurality of columns to include in the training of the word embedding model, the present disclosure contemplates use of a weighting for each column of the relational database, to create a level of adjustment to the neural network model training that can allow data that is more categorical in nature to produce a more usable model that will produce better query results. Recommendations may also be generated with respect to parameters relating to preprocessing of data, such as clustering as described above.

Given the large number of parameters that can be specified for use in different parts of the process of generating a word embedding model from a relational database by training a neural network, it is not hard to understand how word embedding models based on the same source relational database could generate models that vary in terms of how meaningful or useful they are. Furthermore, there are no universal solutions, as a first set of parameters may work well for developing a meaningful word embedding model based on a first data set, but when applied to a different, second data set, the same parameter selections may yield a model that performs poorly. Accordingly, embodiments of the present disclosure present a word embedding model parameter advisor that can identify recommendations for parameters that are likely to lead to the generation of a meaningful (or more meaningful) model based on profiling of the source data used to train the model.

Figure 7:
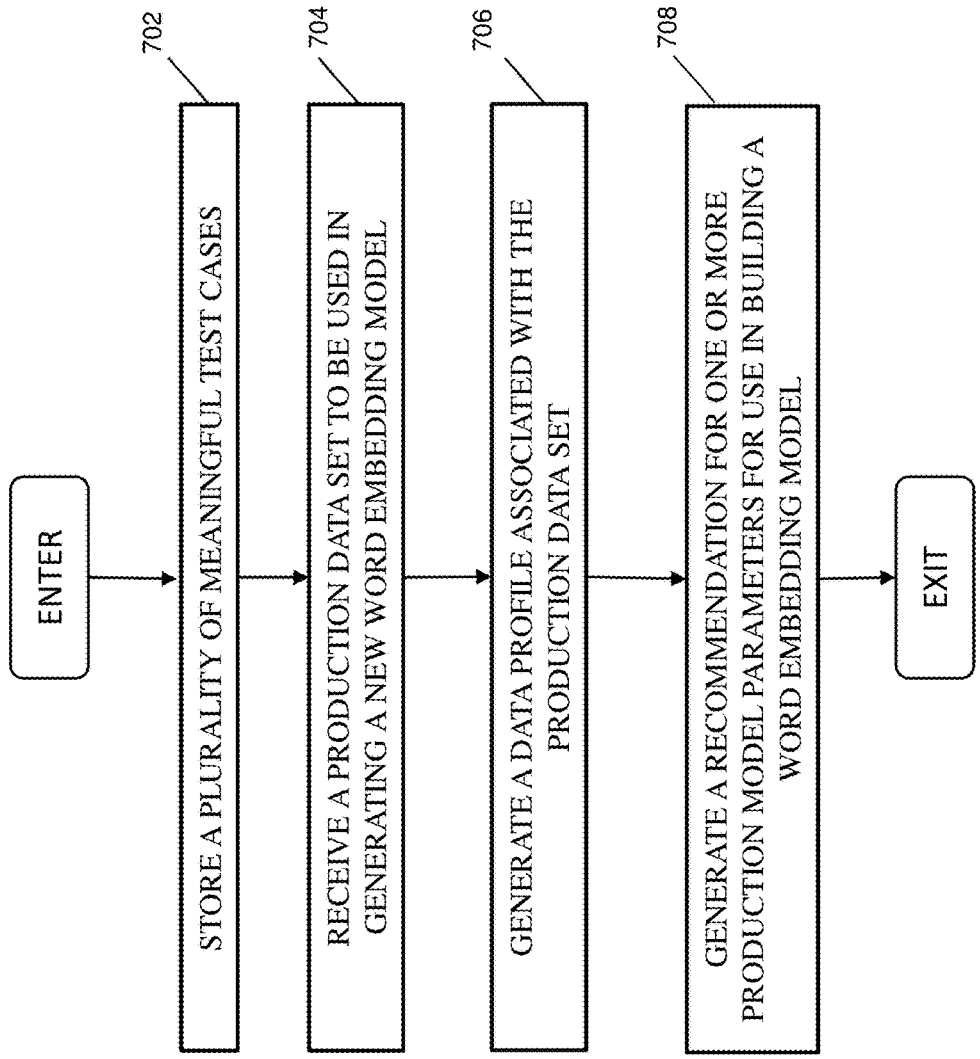
FIG. 7 depicts a method of determining recommended parameters for use in generating a word embedding model in accordance with an example embodiment.

FIG. 7 depicts a flow diagram of a method 700 for an example method of determining recommended parameters for use in generating a word embedding model according to one or more embodiments of the invention. Embodiments of method 700 may be executed by the processing system described in greater detail below with respect to FIG. 9, and may incorporate some or all of the methods and techniques to generate and query a word embedding model described above with respect to FIGS. 1-4. The method 700 begins at block 702 and includes storing a plurality of meaningful test cases. Each meaningful test case may include a test data profile and one or more test model parameters used to create a word embedding model that has been classified as yielding meaningful results. In some embodiments, the plurality of meaningful test cases may represent meaningful word embedding models that have been built based on data sets that have varying characteristics and variations. In some embodiments, the plurality of meaningful test cases may represent a large set of widely varied generated test data variations with known data and known meaningful results.

According to some embodiments, storing a plurality of meaningful test cases may include, for each meaningful test case of the plurality of meaningful test cases, receiving an indication that a word embedding model generated based on a test data set associated with the meaningful test case yields meaningful results, profiling the test data set associated with the meaningful test case to create a test data profile associated with the test case, and mapping the test data profile associated with the meaningful test case to parameters used to produce the word embedding model that yields meaningful results. In other words, each meaningful test case may be representative of word embedding model that was deemed to be meaningful, where the model was based on a set of test data with a known data profile and using a set of known parameters. By mapping known data profiles associated with meaningful word embedding models to parameters used to generate the meaningful word embedding models, relationships between data profiles and parameters that lead to meaningful word models may emerge. According to some embodiments, the mapping process includes parameters and data characteristics as inputs and results as outputs. A profile associated with the test case may represent the statistical relationship between parameters, characteristics and accuracy of model results.

In some embodiments, the indication that the word embedding model yields meaningful results may represent a determination that a degree to which results of one or more queries of the word embedding model correspond to expected results of the one or more queries exceeds a predetermined threshold. For example, in some embodiments, the results of queries of a given word embedding model may yield a plurality of results and/or attributes, and each of the plurality of results/attributes can be compared to expected results/attributes (e.g., by representing the model generated results and expected results in a chart) to determine a degree of overlap or similarity between the two (e.g., a percentage of matching results/attributes). According to some embodiments, meaningfulness may be expressed quantitatively based on a comparison of the correspondence between the query results of the model and the expected query results. The meaningfulness of the model can also be expressed visually by plotting a proximity curve of the query results generated from the model against known/expected results and measuring the correlation between the two. As will be appreciated by those of skill in the art, a higher the level of correlation indicates a more meaningful model.

According to some embodiments, model parameters (both used in association with the meaningful test cases and with respect to recommendations) can include, but are not limited to, one or more of a weighting for each column of the plurality of columns, each weighting to be applied to a respective column of the plurality of columns during generation of the new word embedding model, a selection of one or more columns of the plurality of columns to include in the training of the word embedding model, a number of iterations used to in generating a word embedding model using an artificial neural network, selection of one or more algorithms configured to determine relationships between words for use in generating a word embedding model, debugging parameters, multi-threading parameters, and input and output file names. According to some embodiments, column weighting can be explicit or implicit. An explicit column weighting may include assigning a higher weight to a column based on a level of identifiability associated with the data in a column. For example, a model used to identify criminals may include data reflecting descriptions of various known criminals, a suspect's hair color may be more readily identifiable by a witness than the suspect's weight, and therefore a column reflecting known criminals' hair color may be given more weight than a column reflecting known criminals' weights. An implicit column weighting may be based on a word's significance as a proportion to the size of the vocabulary for a given column. For example, if the data in a column can only be one of two possible values (e.g., "yes" or "no"), then a matching of two yes column values may not be as significant as a match by a single column where there may be ten different possible values. Accordingly, in some embodiments a matching column's weighting may be a function of the number of possible values that can be stored by the column. So for example, a match in hair color between the suspect and the set of known criminals may be given more weight than a match in whether or not the suspect and criminals wear glasses.

Next, as shown at block 704, the method 700 includes receiving a production data set to be used in generating a new word embedding model. The production data set may include data stored in a relational database having a plurality columns and a plurality of rows.

Next, as shown at block 706, the method 700 includes generating a data profile associated with the production data set. According to some embodiments, a data profile may be a file that represents generalized characteristics or attributes of a data set such as a large relational database. According to some embodiments, generating a data profile associated with the production data set comprises characterizing the production data set based on one or more of a number of rows included in the plurality of rows of the relational database, a number of columns included in the plurality of columns of the relational database, a size of a vocabulary of the relational database, wherein the vocabulary comprises a number of unique words or values, for each column of the plurality of columns, a size of vocabulary of the column, for each column of the plurality of columns, a characterization of types of data included in the column (e.g., word, string and numeric types), a distribution of unique words by column, numeric data clustering methods associated with the production data set, cluster edge boundary detection (i.e., determining that many values are close to the minimum and/or maximum boundaries (i.e., edges) of a cluster) associated with the production data set, and any other suitable aspect or attribute of a data set that may be useful in characterizing or profiling the data set. According to some embodiments, the system may analyze a data set (e.g., a relational database) and apply various statistical techniques to generate a data profile of the data.

Next, as shown at block 708, the method 700 includes generating, based on the data profile associated with the production data set and the plurality of meaningful test cases, a recommendation for one or more production model parameters for use in building a word embedding model based on the production data set. According to some embodiments, a recommendation may include a list of recommended parameters values. In some embodiments, a recommendation may include ranked lists of suggested parameters values for one or more given parameters. In some embodiments, a recommendation may include recommended ranges of values for one or more parameters.

In some embodiments, generating a recommendation for one or more production model parameters for use in building a word embedding model based on the production data set can include generating a recommendation for preprocessing of the production data to include one or more of a numeric data clustering method and cluster edge boundary detection method to achieve data clustering. Accordingly, in some embodiments, a recommendation may include a suggested method or approach for clustering data before the clustered data is then used to train the model.

According to some embodiments, the method 700 may include outputting the recommendation for one or more production model parameters for use in building a word embedding model based on the production data set for display. For example, the system may display a recommendation that shows one or more suggested values or ranges of values associated with various parameters that are suggested for use in generating the model. As explained above, the parameter recommendations are designed to be automatically determined by the system such that they attempt to optimize the meaningfulness of a resulting model generated using the recommended parameters with the given data set. According to some embodiments, the display may include a graphical user interface that may allow a user to quickly select recommended parameters or input other parameters and initiate training of a model. In some embodiments, the method 700 may include automatically initiating the training of a word embedding model based on the production data set and the recommendation for one or more production parameters for use in building the word embedding model. Thus, in some embodiments, parameter selection and model training may be fully automated to generate a meaningful word embedding model, without requiring a human designer provide inputs into the design of the model. According to some embodiments, if the recommendation includes multiple possible recommendations for a given one or more parameters (or a range or values for a given one or more parameters), the system may automatically initiate simultaneous training of multiple word embedding models based on the multiple recommendations so that the models may be simultaneously generated and then tested and compared against one another.

According to some embodiments, generating a recommendation for one or more production model parameters for use in building a word embedding model based on the production data set can include recommending a weighting for each column of the plurality of columns. In some embodiments, such a weighting recommendation may be determined by assigning higher relative weightings to columns having a large vocabulary size (e.g., relative to other columns or an average vocabulary size across all columns) and assigning lower relative weightings to columns having a small vocabulary size relative to other columns and/or columns having a high number of null values relative to other columns. As previously described, specifying a weighing of columns can allow data that is more categorical in nature to produce a more usable model that will produce better query results. While neural network model training algorithms conventionally allow data columns to be included or excluded when training, embodiments of the present disclosure create a feature in neural network model training that allows the data relationships to be governed such that a particular column or set of columns of data can be made to have a limited or increased effect on the model produced, as described above. In other words, in some embodiments, column weightings may be input as a parameter that will influence the training of the neural network to give more weight to data associated with columns of higher weightings. Accordingly, embodiments of the present disclosure may enable a query result from categorical database data that may be more accurate than when the query is performed against data where the model was trained with equal weighting of columns or with columns excluded from the training. According to some embodiments, relational database table statistics can be calculated such that the column attributes, number of categories (i.e., number of unique values in a column), and user intentions (e.g., the intent of including a column of data in the model and its correlation to the other columns of data) can be understood such the parameters that are used in the model training produce a model that optimizes the relationships between the columns of data in order to produce the desired results when the data is queried.

In some embodiments, generating a recommendation for one or more production model parameters for use in building a word embedding model based on the test data set may include identifying, based on a comparison of the data profile associated with the production data set to test data profiles associated with the plurality of meaningful test cases, a most similar test data profile of the meaningful test cases and selecting one or more model parameters based on the one or more test model parameters associated with the meaningful test case comprising the most similar test data profile. For example, if there are twenty known meaningful test cases, each being associated with a respective data profile and a set of parameters, the system may identify which of the twenty data profiles of the known meaningful test cases most closely matches the data profile of the production data and recommend use of the parameters used to generate the known meaningful test case associated with the identified most similar data profile. In some embodiments, similarity between data profiles can be determined by determining an amount of overlap or similarity between data characteristics of the data profiles (e.g., the number of rows, the number of columns, a size of vocabulary, the types of data included in columns, the total amount of data, etc.) and identifying the data set having the highest degree of matching. In some embodiments, the aspects or data characteristics may be weighted when determining similarity between data profiles, such that, for example, having a matching number of columns may be a more important indicator of data profile similarity than having a matching number of rows. According to some embodiments, the system may apply data clustering techniques to data sets prior to determining a data profile or similarity between data profiles to create a more generalized view of the data prior to comparison to other data profiles. As will be appreciated by those of skill in the art, many different algorithms, techniques, and/or statistical comparisons may be used in the process of determining similarity between data profiles and the disclosure contemplates that any known method or combination of methods of comparison may be employed to identify the most similar data profile(s) to that of the production data profile.

In some embodiments, generating a recommendation for one or more production model parameters for use in building a word embedding model based on the test data set may include identifying, based on a comparison of the data profile associated with the production data set to test data profiles associated with the plurality of meaningful test cases, a plurality of similar test data profiles of the meaningful test cases, wherein each similar test data profile exceeds a threshold level of similarity with the data profile associated with the production data and selecting one or more model parameters based on the one or more test model parameters associated with each of the meaningful test cases corresponding to the plurality of similar test data profiles. Thus, according to some embodiments, if the system determines that the production data profile is similar to more than one test data profile associated with known meaningful test cases, then the system may recommend a parameter set that represents a combination of the parameters associated with those known meaningful test cases. For example, if the system identifies that the production data profile is similar to three different test data profiles, for a given parameter the system may select a value that is used by a majority (i.e., at least two) of the similar test cases or the system may selected a value that represents an average or a weighted average (i.e., based on a degree of similarity between profiles) of the parameter values associated with the known meaningful test cases associated with the similar test data. In some embodiments, the system may include all of the parameter values associated with all of the similar test cases as alternative recommended values in the parameter recommendation.

Figure 8:
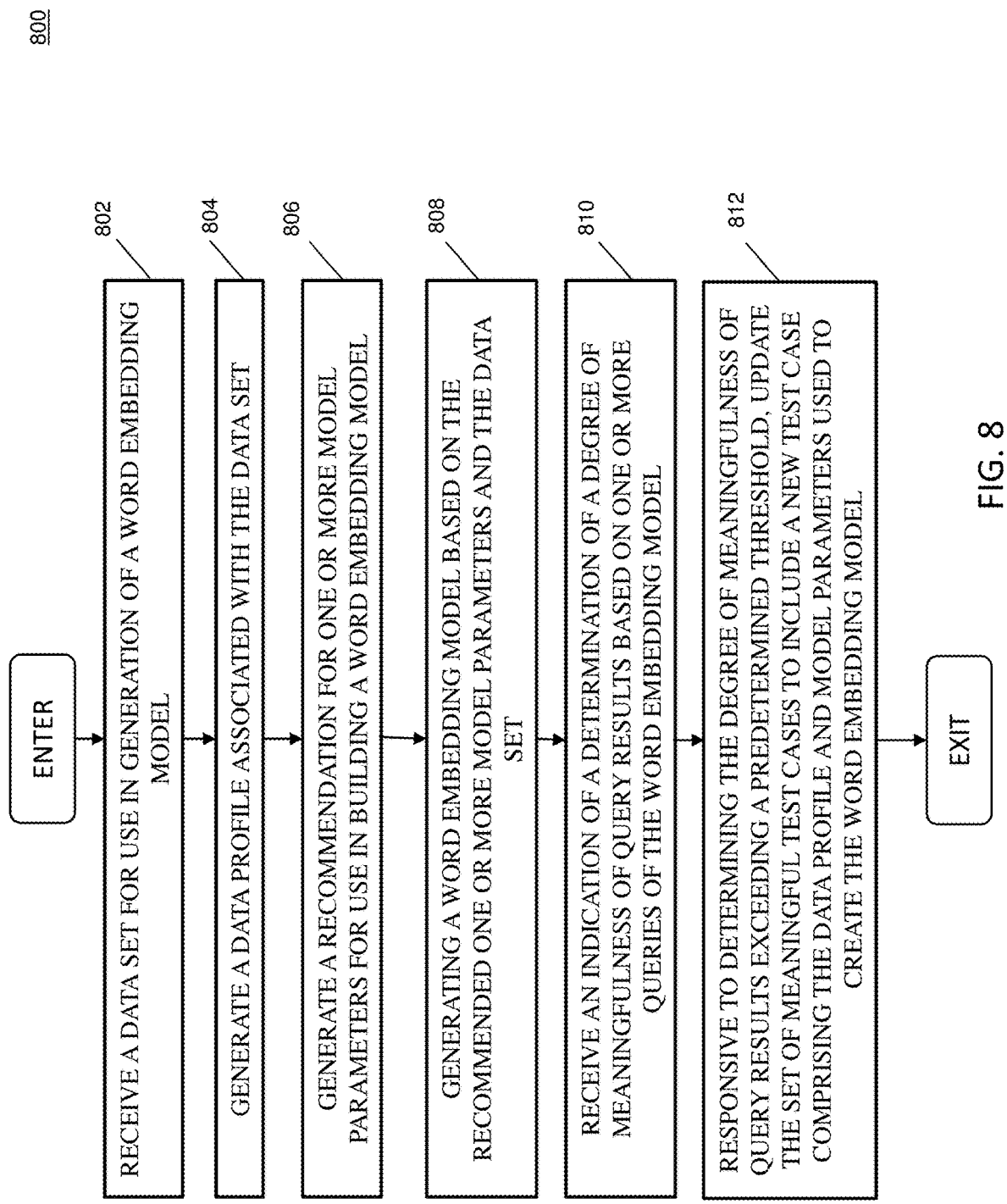
FIG. 8 depicts a method of updating a word embedding model parameter advisor in accordance with an example embodiment.

FIG. 8 depicts a flow diagram of a method 800 of updating a word embedding model parameter advisor according to one or more embodiments of the invention. Embodiments of method 800 may be executed by the processing system described in greater detail below with respect to FIG. 9, and may incorporate some or all of the methods and techniques to generate and query a word embedding model described above with respect to FIGS. 1-4. The method 800 begins at block 802 and includes receiving a data set for use in generation of a word embedding model. For example, a data set may be a relational database having a plurality columns and a plurality of rows.

Next, as shown at block 804, the method 800 includes generating a data profile associated with the data set in a manner similar to that of block 706 described above with respect to FIG. 7. In some embodiments, generating a data profile associated with the production data set comprises characterizing the production data set based on various aspects of the production data set that may include but are not limited to one or more of: a number of rows included in the plurality of rows of the relational database, a number of columns included in the plurality of columns of the relational database, a size of a vocabulary of the relational database (wherein the vocabulary comprises a number of unique words or values), a size of vocabulary of each column, a characterization of types of data included in each column (e.g., word, string and numeric types, etc.), a distribution of unique words by column, numeric data clustering methods associated with the production data set and cluster edge boundary detection associated with the production data set. A data profile may include a characterization of a number of aspects of the data set, including for example, some or all of the aspects described above, as well as other aspects of the data that may be useful in characterizing the data set as a whole. According to some embodiments, the system may analyze a data set (e.g., a relational database) and apply various statistical techniques to generate a data profile of the data. In some embodiments, the system may apply different weightings to various aspects of the data relative to other aspects such that the data profile may reflect that some aspects are more important than others in determining the overall nature or character of the data set.

Next, as shown at block 806, the method 800 includes generating, based on the data profile and a set of meaningful test cases, a recommendation for one or more model parameters for use in building a word embedding model in a manner similar to that of block 708 described above with respect to FIG. 7. According to some embodiments, the set of meaningful test cases may include a plurality of known meaningful test cases, each known meaningful test case being associated with respective test data and respective selected parameters, each known meaningful test case being classified as yielding meaningful results in response to creating a word embedding model by training a neural network using unsupervised machine learning based on the respective test data and the respective selected parameters.

Next, as shown at block 808, the method 800 includes generating, by training a neural network using unsupervised machine learning based on the first data set, a word embedding model based on the recommended one or more model parameters and the data set in a manner similar to, for example, FIGS. 1-3 described above.

Next, as shown at block 810, based on one or more queries of the word embedding model, the method 800 includes receiving an indication of a determination of a degree of meaningfulness of query results. For example in some embodiments, an indication of a determination of a degree of meaningfulness may be a binary indication (e.g., "meaningful" or "not meaningful") or may be a value on a scale of values (e.g., 80% meaningful). According to some embodiments, receiving an indication of a determination of a degree of meaningfulness of query results may include receiving a user input representing the degree of meaningfulness of query results. In some embodiments, an indication of a determination of a degree of meaningfulness of query results can be automatically determined by the system by using a convergence test during test case runs with varying parameters. In some embodiments, an indication of a determination of a degree of meaningfulness of query results can be automatically determined by correlating proximity result series and actual data similarity.

Next, as shown at block 812, in response to the degree of meaningfulness of query results exceeding a predetermined threshold, the method 800 includes updating the set of meaningful test cases to include a new test case comprising the data profile and model parameters used to create the word embedding model. For example, for embodiments where the degree of meaningfulness is binary, exceeding the threshold may be considered to be having an indication of "meaningful." In embodiments where the degree of meaningfulness is a value on a scale of values, the threshold may similarly be represented by a value on the scale (e.g., 7 out of 10, 75%, or the like). According to some embodiments, the set of meaningful test cases may be updated to include the new test case by, for example, mapping the data profile of the new test case to the recommended parameters used to generate the word embedding model and storing the data profile of the new test case and the associated parameter values. Thus, the system may include a word embedding model parameter advisor that first recommends parameters for use in generating a word embedding model, but then may be updated to include the data profile and recommended parameters used to create the word embedding model if the word embedding model that was generated using the recommended parameters is considered to be a meaningful model. In some embodiments, if the set of meaningful test cases includes a test case that is similar to the newly added test case then the system may increase a confidence weighting associated with the test case to indicate that the test case provides a strong guide for generating parameter recommendations for new data sets having a similar data profile. In this way, the advisor can iteratively make recommendations with respect to subsequent data sets and update the test cases it draws from to make recommendations to include models generated from production data and recommended parameters that result in meaningful models.

Additional processes may also be included. It should be understood that the processes depicted in FIGS. 2 and 6-8 represent illustrations, and that other processes may be added or existing processes may be removed, modified, or rearranged without departing from the scope and spirit of the present disclosure.

Figure 9:
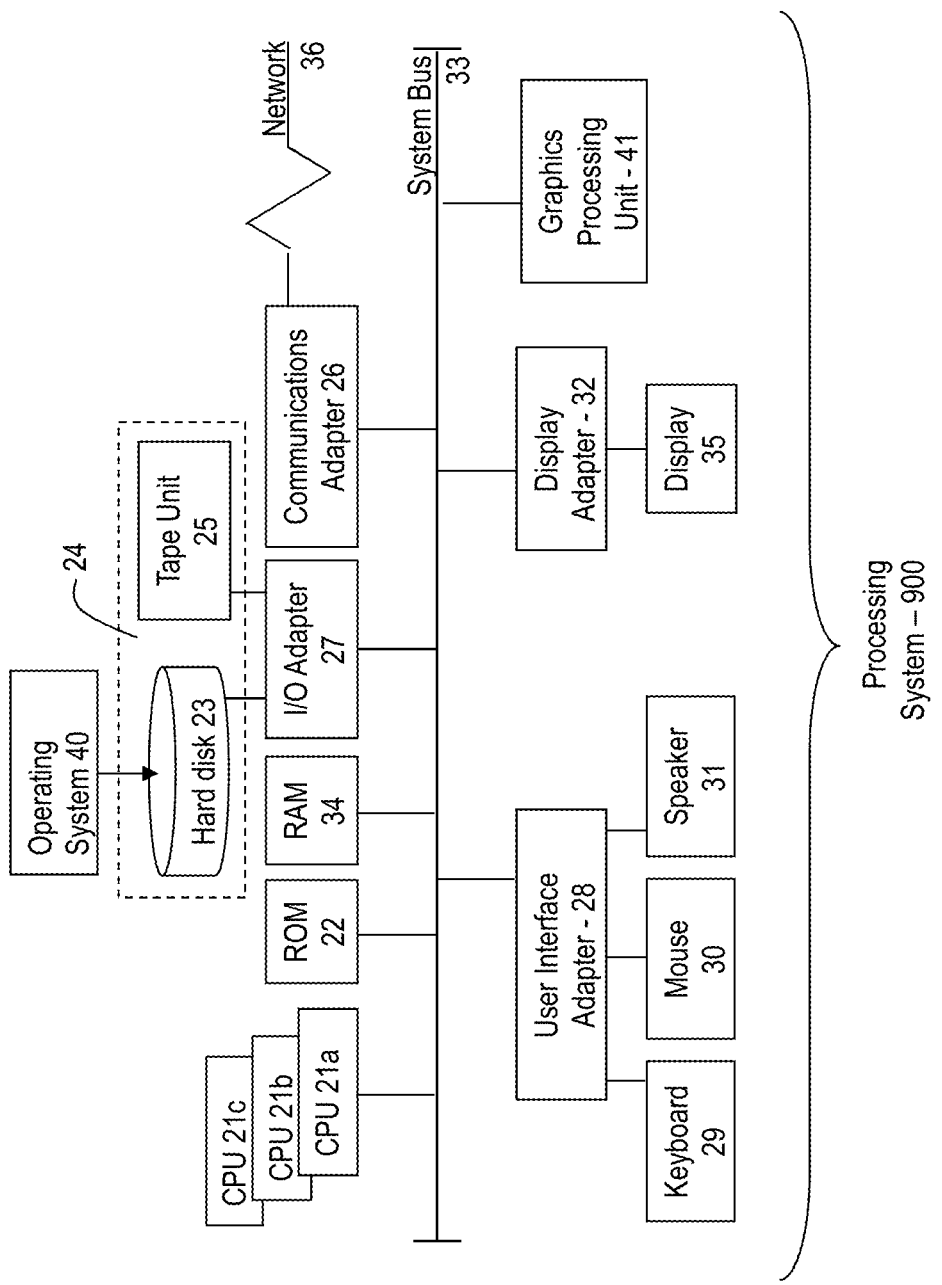
FIG. 9 depicts a block diagram of a computer system for use in implementing one or more embodiments of the present invention.

Referring to FIG. 9, there is shown an embodiment of a processing system 900 for implementing the teachings herein. In this embodiment, the system 900 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 900.

FIG. 9 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 900 may be stored in mass storage 24. A network adapter 26 interconnects bus 33 with an outside network 36 enabling data processing system 900 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 900 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 9, the system 900 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   storing a plurality of meaningful test cases, each meaningful test case comprising a test data profile and one or more test model parameters used to create a word embedding model that has been classified as yielding meaningful results;
   receiving a production data set to be used in generating a new word embedding model, wherein the production data set comprises data stored in a relational database having a plurality of columns and a plurality of rows identifying a plurality of different header tokens and storing a plurality of non-header tokens in relation to the header tokens;

generating a data profile associated with the production data set;

generating, based on the data profile associated with the production data set and the plurality of meaningful test cases, a recommendation for one or more production model parameters for use in building a word embedding model based on the production data set, the word embedding model including one or more of selected non-header tokens among the plurality of non-header tokens included in the relational database to define a first target row vector having a vector size; and changing the selected non-header tokens to change the row vector and vary the vector size to define a second target row vector without changing the relational database, wherein the first target row vector is indicative of a first similarity to at least one remaining row vector defined by the non-header tokens included in a corresponding remaining row including in the relational database, and the second target row vector is indicative of a second similarity to the at least one remaining row vector defined by the non-header tokens included in a corresponding remaining row including in the relational database, and wherein the first similarity between the first target row vector and the at least one remaining row vector is different than the second similarity between the second target row vector and the at least one remaining row vector.

2. The computer-implemented method of claim 1, wherein storing a plurality of meaningful test cases comprises, for each meaningful test case of the plurality of meaningful test cases:

receiving an indication that a word embedding model generated based on a test data set associated with the meaningful test case yields meaningful results;

profiling the test data set associated with the meaningful test case to create a test data profile associated with the test case; and mapping the test data profile associated with the meaningful test case to parameters used to produce the word embedding model that yields meaningful results.

3. The computer-implemented method of claim 2, wherein the indication that the word embedding model yields meaningful results represents a determination that a degree to which results of one or more queries of the word embedding model correspond to expected results of the query exceeds a predetermined threshold.

4. The computer-implemented method of claim 1, further comprising:

outputting the recommendation for one or more production model parameters for use in building a word embedding model based on the production data set for display.

5. The computer-implemented method of claim 1, further comprising, automatically initiating the training of a word embedding model based on the production data set and the recommendation for one or more production parameters that determine the one or more selected tokens used to build the word embedding model.

6. The computer-implemented method of claim 1, wherein generating a data profile associated with the production data set comprises characterizing the production data set based on one or more of:

a number of rows included in the plurality of rows of the relational database;

a number of columns included in the plurality of columns of the relational database;

a size of a vocabulary of the relational database, wherein the vocabulary comprises a number of unique words or values;

for each column of the plurality of columns, a size of vocabulary of the column;

for each column of the plurality of columns, a characterization of types of data included in the column, wherein types of data comprise at least word, string and numeric types;

a distribution of unique words by column;

numeric data clustering methods associated with the production data set; and cluster edge boundary detection associated with the production data set.

7. The computer-implemented method of claim 6, wherein model parameters comprise one or more of:

a weighting for each column of the plurality of columns, each weighting to be applied to a respective column of the plurality of columns during generation of the new word embedding model;

a selection of one or more columns of the plurality of columns to include in the training of the word embedding model;

a number of iterations used to in generating a word embedding model using a neural network;

a selection of one or more algorithms configured to determine relationships between words for use in generating a word embedding model;

debugging parameters;

multi-threading parameters; and input and output file names.

8. The computer-implemented method of claim 7, wherein generating a recommendation for one or more production model parameters for use in building a word embedding model based on the production data set comprises recommending a weighting for each column of the plurality of columns, the recommendation being determined by:

assigning higher relative weightings to columns comprising a large vocabulary size relative to other columns; and assigning lower relative weightings to columns having a small vocabulary size relative to other columns and columns having a high number of null values relative to other columns.

9. The computer-implemented method of claim 1, wherein generating a recommendation for one or more production model parameters for use in building a word embedding model based on the test data set comprises:

identifying, based on a comparison of the data profile associated with the production data set to test data profiles associated with the plurality of meaningful test cases, a most similar test data profile of the meaningful test cases; and selecting one or more model parameters based on the one or more test model parameters associated with the meaningful test case comprising the most similar test data profile.

10. The computer-implemented method of claim 1, wherein generating a recommendation for one or more production model parameters for use in building a word embedding model based on the test data set comprises:
  identifying, based on a comparison of the data profile associated with the production data set to test data profiles associated with the plurality of meaningful test cases, a plurality of similar test data profiles of the meaningful test cases, wherein each similar test data profile exceeds a threshold level of similarity with the data profile associated with the production data; and
  selecting one or more model parameters based on the one or more test model parameters associated with each of the meaningful test cases corresponding to the plurality of similar test data profiles.

11. The computer-implemented method of claim 1, wherein generating a recommendation for one or more production model parameters for use in building a word embedding model based on the production data set comprises generating a recommendation for preprocessing of the production data to include one or more of:
  a numeric data clustering method; and
  cluster edge boundary detection method to achieve data clustering.

12. A system comprising:
  a processor communicatively coupled to a memory, the processor configured to:
  store a plurality of meaningful test cases, each meaningful test case comprising a test data profile and one or more test model parameters used to create a word embedding model that has been classified as yielding meaningful results;
  receive a production data set to be used in generating a new word embedding model, wherein the production data set comprises data stored in a relational database having a plurality of columns and a plurality of rows identifying a plurality of different header tokens and storing a plurality of non-header tokens in relation to the header tokens;
  generate a data profile associated with the production data set;
  generate, based on the data profile associated with the production data set and the plurality of meaningful test cases, a recommendation for one or more production model parameters for use in building a word embedding model based on the production data set the word embedding model including one or more of selected non-header tokens among the plurality of non-header tokens included in the relational database to define a word first target row vector having a vector size,
  wherein changing the selected non-header tokens changes the row vector and varies the vector size to define a second target row vector without changing the relational database,
  wherein the first target row vector is indicative of a first similarity to at least one remaining row vector defined by the non-header tokens included in a corresponding remaining row including in the relational database, and the second target row vector is indicative of a second similarity to the at least one remaining row vector defined by the non-header tokens included in a corresponding remaining row including in the relational database, and
  wherein the first similarity between the first target row vector and the at least one remaining row vector is different than the second similarity between the second target row vector and the at least one remaining row vector.

13. The system of claim 12, wherein storing a plurality of meaningful test cases comprises, for each meaningful test case of the plurality of meaningful test cases:
  receiving an indication that a word embedding model generated based on a test data set associated with the meaningful test case yields meaningful results;
  profiling the test data set associated with the meaningful test case to create a test data profile associated with the meaningful test case; and
  mapping the test data profile associated with the meaningful test case to parameters used to produce the word embedding model that yields meaningful results.

14. The system of claim 13, wherein the indication that the word embedding model yields meaningful results represents a determination that a degree to which results of one or more queries of the word embedding model correspond to expected results of the query exceeds a predetermined threshold.

15. The system of claim 12, wherein the processor is further configured to automatically initiate the training of a word embedding model based on the production data set and the recommendation for one or more production parameters for use in building the word embedding model.

16. A computer program product comprising a computer readable storage medium having program instructions embodied therewith the program instructions executable by a computer processor to cause the computer processor to perform a method comprising:
  storing a plurality of meaningful test cases, each meaningful test case comprising a test data profile and one or more test model parameters used to create a word embedding model that has been classified as yielding meaningful results;
  receiving a production data set to be used in generating a new word embedding model, wherein the production data set comprises data stored in a relational database having a plurality of columns and a plurality of rows, the word embedding model including one or more of selected non-header tokens among the plurality of non-header tokens included in the relational database to define a row vector having a vector size;
  generating a data profile associated with the production data set; and
  generating, based on the data profile associated with the production data set and the plurality of meaningful test cases, a recommendation for one or more production model parameters for use in building a word embedding model based on the production data set, the word embedding model including one or more of selected non-header tokens among the plurality of non-header tokens included in the relational database to define a first target row vector having a vector size,
  wherein changing the selected non-header tokens changes the row vector and varies the vector size to define a second target row vector without changing the relational database,
  wherein the first target row vector is indicative of a first similarity to at least one remaining row vector defined by the non-header tokens included in a corresponding remaining row including in the relational database, and the second target row vector is indicative of a second similarity to the at least one remaining row vector defined by the non-header tokens included in a corresponding remaining row including in the relational database, and
  wherein the first similarity between the first target row vector and the at least one remaining row vector is different than the second similarity between the second target row vector and the at least one remaining row vector.

17. The computer program product of claim 16, wherein storing a plurality of meaningful test cases comprises, for meaningful each test case of the plurality of meaningful test cases:
   receiving an indication that a word embedding model generated based on a test data set associated with the meaningful test case yields meaningful results;
   profiling the test data set associated with the test case to create a test data profile associated with the meaningful test case; and
   mapping the test data profile associated with the meaningful test case to parameters used to produce the word embedding model that yields meaningful results.

18. The computer program product of claim 17, wherein the indication that the word embedding model yields meaningful results represents a determination that a degree to which results of one or more queries of the word embedding model correspond to expected results of the query exceeds a predetermined threshold.

19. The computer program product of claim 16, the method further comprising automatically initiating the training of a word embedding model based on the production data set and the recommendation for one or more production parameters for use in building the word embedding model.

20. A computer-implemented method comprising:
   receiving a data set for use in generation of a word embedding model, the data set comprising data stored in a relational database having a plurality of columns and a plurality of rows identifying a plurality of different header tokens and storing a plurality of non-header tokens in relation to the header tokens;
   generating a data profile associated with the data set;
   generating, based on the data profile and a set of meaningful test cases, a recommendation for one or more model parameters for use in building a word embedding model, the word embedding model including one or more of selected non-header tokens among the plurality of non-header tokens included in the relational database to define a first target row vector having a vector size,
   wherein changing the selected non-header tokens changes the row vector and varies the vector size to define a second target row vector without changing the relational database;
   wherein the first target row vector is indicative of a first similarity to at least one remaining row vector defined by the non-header tokens included in a corresponding remaining row including in the relational database, and the second target row vector is indicative of a second similarity to the at least one remaining row vector defined by the non-header tokens included in a corresponding remaining row including in the relational database, and
   wherein the first similarity between the first target row vector and the at least one remaining row vector is different than the second similarity between the second target row vector and the at least one remaining row vector
   generating, by training a neural network using unsupervised machine learning based on the first data set, the word embedding model based on the recommended one or more model parameters and the data set;
   based on one or more queries of the word embedding model, receiving an indication of a determination of a degree of meaningfulness of query results;
   responsive to the degree of meaningfulness of query results exceeding a predetermined threshold, updating the set of meaningful test cases to include a new test case comprising the data profile and model parameters used to create the word embedding model.

21. The computer-implemented method of claim 20, wherein generating a data profile associated with the data set comprises characterizing the data set based on one or more of:
   a number of rows included in the plurality of rows of the relational database;
   a number of columns included in the plurality of columns of the relational database;
   a size of a vocabulary of the relational database, wherein the vocabulary comprises a number of unique words or values;
   for each column of the plurality of columns, a size of vocabulary of the column;
   for each column of the plurality of columns, a characterization of types of data included in the column, wherein types of data comprise at least word, string and numeric types;
   a distribution of unique words by column;
   numeric data clustering methods associated with the data set; and
   cluster edge boundary detection associated with the data set.

22. The computer-implemented method of claim 20, wherein the set of meaningful test cases comprise a plurality of known meaningful test cases, each known meaningful test case being associated with respective test data and respective selected parameters, each known meaningful test case being classified as yielding meaningful results in response to creating a word embedding model by training a neural network using unsupervised machine learning based on the respective test data and the respective selected parameters.

23. The computer-implemented method of claim 20, wherein receiving an indication of a determination of a degree of meaningfulness of query results comprises receiving a user input representing the degree of meaningfulness of query results.

24. A system comprising:
   a processor communicatively coupled to a memory, the processor configured to:
   receive a data set for use in generation of a word embedding model, the data set comprising data stored in a relational database having a plurality of columns and a plurality of rows identifying a plurality of different header tokens and storing a plurality of non-header tokens in relation to the header tokens;
   generate a data profile associated with the data set;
   generate, based on the data profile and a set of meaningful test cases, a recommendation for one or more model parameters for use in building a word embedding model, the word embedding model including one or more of selected non-header tokens among the plurality of non-header tokens included in the relational database to define a first target row vector having a vector size,
   wherein changing the selected non-header tokens changes the row vector and varies the vector size to define a second target row vector without changing the relational database;
   wherein the first target row vector is indicative of a first similarity to at least one remaining row vector defined by the non-header tokens included in a corresponding remaining row including in the relational database, and the second target row vector is indicative of a second similarity the at least one remaining row vector defined by the non-header tokens included in a corresponding remaining row including in the relational database, and wherein the first similarity between the first target row vector and the at least one remaining row vector is different than the second similarity between the second target row vector and the at least one remaining row vector;

generate, by training a neural network using unsupervised machine learning based on the first data set, the word embedding model based on the recommended one or more model parameters and the data set;

based on one or more queries of the word embedding model, receive an indication of a determination of a degree of meaningfulness of query results;

responsive to the degree of meaningfulness of query results exceeding a predetermined threshold, update the set of meaningful test cases to include a new test case comprising the data profile and model parameters used to create the word embedding model.

25. The system of claim 24, wherein receiving an indication of a determination of a degree of meaningfulness of query results comprises receiving a user input representing the degree of meaningfulness of query results.

\* \* \* \* \*